(12) United States Patent
Surkau et al.

(10) Patent No.: US 9,378,401 B2
(45) Date of Patent: Jun. 28, 2016

(54) SYSTEM FOR THE DETECTION OF CUSTOMER MEDIA COMPRISING AN RF TRANSCEIVER IN A PUBLIC TRANSPORT CONVEYANCE

(71) Applicants: SKIDATA AG, Groedig/Salzburg (AT); EM MICROELECTRONIC-MARIN SA, Marin (CH)

(72) Inventors: Reinhard Surkau, Groedig/Salzburg (AT); Charles Egli, Cheseaux (CH); Fabien Maupas, Pontarlier (FR); Oliver Prevost, Pontarlier (FR)

(73) Assignees: SKIDATA AG, Groedig/Salzburg (AT); EM MICROELECTRONIC-MARIN SA, Marin (CH)

( * ) Notice: Subject to any disclaimer, the term of this patent is extended or adjusted under 35 U.S.C. 154(b) by 0 days.

(21) Appl. No.: 14/452,556

(22) Filed: Aug. 6, 2014

(65) Prior Publication Data

US 2015/0090787 A1   Apr. 2, 2015

(30) Foreign Application Priority Data

Aug. 6, 2013   (EP) .................................... 13179399

(51) Int. Cl.
*G06K 7/10* (2006.01)
*G07B 15/02* (2011.01)
*G01S 13/75* (2006.01)

(52) U.S. Cl.
CPC ............ *G06K 7/10425* (2013.01); *G07B 15/02* (2013.01); *G01S 13/75* (2013.01)

(58) Field of Classification Search
CPC ............................. G06K 7/10425; G07B 15/02
USPC ......................................................... 235/384
See application file for complete search history.

(56) References Cited

U.S. PATENT DOCUMENTS

| 6,705,526 | B1 * | 3/2004 | Zhu et al. ................. 235/472.01 |
| 2005/0242951 | A1 * | 11/2005 | Simonazzi .................... 340/552 |
| 2008/0100450 | A1 | 5/2008 | Ayyagari et al. |
| 2011/0025464 | A1 | 2/2011 | Geng et al. |
| 2011/0080323 | A1 * | 4/2011 | Thiam et al. ........... 343/700 MS |

FOREIGN PATENT DOCUMENTS

| WO | 0120557 A1 | 3/2001 |
| WO | 2011066327 A1 | 6/2011 |

* cited by examiner

*Primary Examiner* — Toan Ly
(74) *Attorney, Agent, or Firm* — Karl F. Milde, Jr.; Eckert Seamans Cherin & Mellott, LLC

(57) ABSTRACT

A system for detecting customer media comprising an RF transceiver in a public transport conveyance is proposed, where the system for each passenger compartment or car includes a number of reading devices, which are interconnected and connected to an on-board unit for the purpose of data communication, where the entire interior of passenger compartment or car is covered by a number of reading devices, where the reading devices are arranged in such a manner that any two reading devices are provided on opposite lateral walls of the passenger compartment or car, which cover the room up to the opposite wall, where each two reading units are arranged in the roof area or floor area symmetrically around the central longitudinal axis of the passenger compartment or vehicle, where the detection range of the respective two reading devices is substantially identical and substantially covers the entire width of the passenger compartment or car in the floor area or roof area, where the floor area or the roof area is covered considered axially along a pre-specified length.

8 Claims, 8 Drawing Sheets

SYSTEM FOR THE DETECTION OF CUSTOMER MEDIA COMPRISING AN RF TRANSCEIVER IN A PUBLIC TRANSPORT CONVEYANCE

BACKGROUND OF THE INVENTION

The present invention relates to a system for the detection of customer media comprising an RF transceiver in a public transport conveyance, in particular for the implementation of a be-in-be-out ticket collection system.

In a be-in-be-out ticket collection system, the need for an as accurate as possible localisation of the customer media within the conveyance, whereby one customer medium is respectively assigned per person. For detecting a customer medium comprising an RF transceiver, reading devices are used, which generally communicate with the customer media in the GHz range, for example, at 860-950 MHz, 2.4 GHz or higher.

This can result in a disadvantageous situation that due to an overreach by the reading devices, customer media that are outside the conveyance are also detected. This can for example be the case, if a cyclist rides with a customer medium next to a city bus.

SUMMARY OF THE INVENTION

The present invention is therefore based on the task to specify a system for the detection of customer media comprising an RF transceiver, which largely solves the mentioned problem of overreach and with the low power of the reading devices ensures an as accurate as possible localisation of the customer media.

Accordingly, a system is proposed for detecting customer media comprising an RF transceiver in a conveyance, which comprises a number of reading devices per passenger compartment or car, which are interconnected and connected to an on-board unit computer of the conveyance via a CAN-bus or other suitable means for the purpose of data communication. The power supply of the reading devices can also be guaranteed via the CAN bus. The reading devices also provide the on-board unit with information about the signal strength, with which the signal of a customer medium is received by the reading devices and/or information about the signal duration of signal of the customer medium. In the on-board unit, the data of the customer media are stored and optionally, analysed, such as the media information, which may be a biunique number, where a localisation of the customer media can be carried out based on the signal duration and/or the signal strength of the signals of the customer media. Furthermore, the reading devices are controlled by the on-board unit in order to carry out the communication with the customer media.

Here, the reading devices are arranged in such a manner that any two reading devices are provided at opposite, preferably lateral walls of the passenger compartment or car, which cover the room up to the opposite wall, so that on the one hand a high degree of redundancy of the system in the recovery of data is created and on the other hand, the safeguarding against failure is increased, since the space is covered by the opposite reader in the event that a reading device fails. By the redundant detection, the data of the reading devices in question may be used for the purpose of determining a local positioning of the customer medium, which is based on the signal strength or the signal duration, with which the signal of the customer medium has been received by the respective reading device. By the redundant reading of the customer medium, a mutual positive check of the reading devices may also be enabled in order to detect failures of the transmitting and receiving components of the reading devices.

As part of a further development of the invention, the detection range of a reading device attached to the side wall of the passenger compartment or a car extends to the reading devices situated diagonally opposite to this reading device, thus respectively four reading devices cover a common volume. This means that in simultaneous detection of a customer medium up to four received signals (respectively from one reading device) are transmitted to the on-board unit. Due to this high degree of redundancy and on the basis of signal strength or signal duration, with which the signal of the customer medium is received by the respective reading device, the location determination of the customer medium can be optimised.

The reading devices may also be arranged in such a manner that two reading units are respectively arranged symmetrically in the roof area or in the floor area around the longitudinal axis of the passenger compartment or car, where the detection range of the respective two reading devices is substantially identical, and substantially covers the entire width of the passenger compartment or car in the floor area or roof area, where the floor area or the roof area viewed axially is covered along a pre-specified length.

Furthermore, two reading devices are arranged opposite to each other in the floor and roof area of the passenger compartment or car, where the reading devices cover the room up to the opposite roof or floor area.

Here, it can also be provided that the detection range of the reading device arranged in this way, viewed axially, covers the adjacent reading devices fully or partially, whereby respectively up to six reading devices cover a common volume up to a predetermined height. This means that in case of simultaneous detection of a customer medium, up to six received signals are transferred to the on-board unit and evaluated, by which the location determination of the customer medium can be optimised based on the signal strength or signal duration, with which the signal of the customer medium is received by the respective reading device.

The reading devices are preferably arranged in such a manner that the entire interior of the passenger compartment or the car is covered by a number of reading devices situated opposite to each other or provided in the roof area or in the floor area symmetrically around the central longitudinal axis of the passenger compartment. Here, the detection of customer media is performed over a purely direct line of sight.

By increasing the number of the reading devices, the amount of detections to be handled by any one reading device decreases, which can reduce the required transmission power per reading device. The number of reading devices is preferably selected in such a manner that the passenger compartment or the car is redundantly and completely covered without significant overreach beyond the passenger compartment or car, which results in keeping the transmission power per reading device low.

Consequently, on the one hand, the transmission power is reduced, while on the other hand the overreach and consequently the number of detections of customer media located outside of a passenger compartment or car is largely minimised.

The reading devices feature only one antenna to transmit and receive signals. As part a further development of the invention, the reading devices feature a wake-up-modulator, by which a wake-up signal can be transmitted for the customer media by means of the antenna. After receiving the wake-up signal, the appropriately designed customer media move from a sleep-mode to an active mode.

The wake-up signal is preferably transmitted as amplitude-modulated, and includes a predetermined signal sequence, where for example the signal received by an antenna of the customer medium is amplified and demodulated by operational amplifier serving as a detection module, and is evaluated by a microprocessor of the customer medium partially activated in the "sleep mode", where in case of a wake-up signal detected as valid, i.e. a signal with the proper sequence, the microprocessor is fully activated and a transceiver of the customer medium is turned on, whereby the customer medium goes into an active mode, as part of which the communication with the on-board unit can occur via at least one reading device.

The antennas are directed as radiant and receiving antennas, and preferably implemented as patch antennas on a PCB substrate. Such antennas feature a desired directional radio pattern with a very flat structural form, whereby the opening cone can be adjusted by appropriate dimension choices of and the number of patches. In this way, the spatial selectivity is increased and the analysis of the so-called in/out problem (a customer medium is inside or outside the conveyance) with respect to the localisation of the customer medium is simplified.

The reading device preferably features a flat housing (for example, with a height of 8 mm), where the side facing the passenger compartment or the car in assembled state includes the antenna and the necessary electronics, such as a transceiver and optionally a wake-up modulator is arranged on the back side.

This configuration of the antennas also allows a slightly curved design as well as the provision of a flat plastic cover, so that an inconspicuous and appropriate placement of the reading devices in the roof are or the wall area of the passenger compartment is possible.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
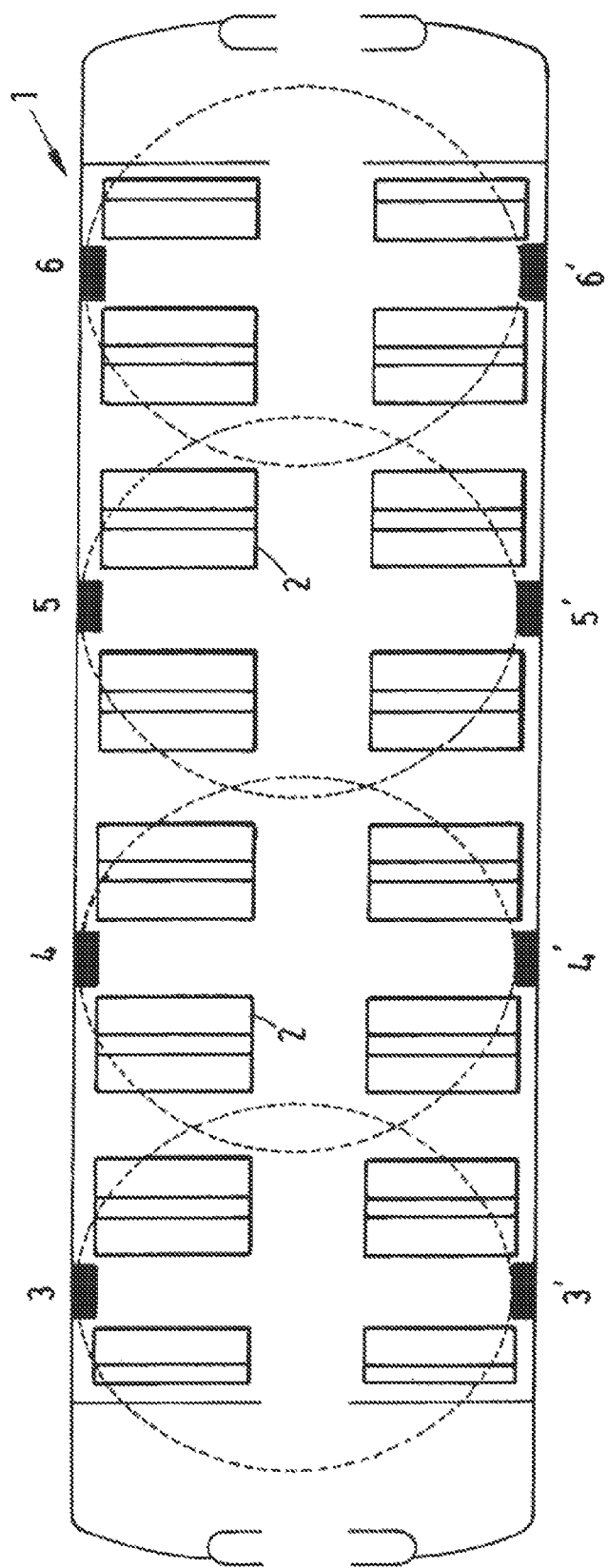
FIG. 1 is a schematic plan view of a first embodiment of the arrangement of reading devices of the system for detection of customer media.

The preferred embodiments of the present invention will now be described with reference to FIGS. 1-8 of the drawings. Identical elements in the various figures are designated with the same reference numerals.

In FIG. 1, a passenger compartment 1 is shown comprising several seats 2. According to a first embodiment of the invention, the reading devices of the system are arranged in such a manner that each two reading devices 3, 3', 4, 4', 5,5', 6, 6' are provided on opposite lateral walls of the passenger compartment, which cover the space up to the opposite wall. Thus, a high level of redundancy of the system is provided in the recovery of data, where the reliability is increased in an advantageous manner, since in the event that a reading device fails, the space is detected by the opposite reading device, as illustrated in addition with reference to FIG. 2 on the basis of the reading devices 3, 3'.

Figure 2:
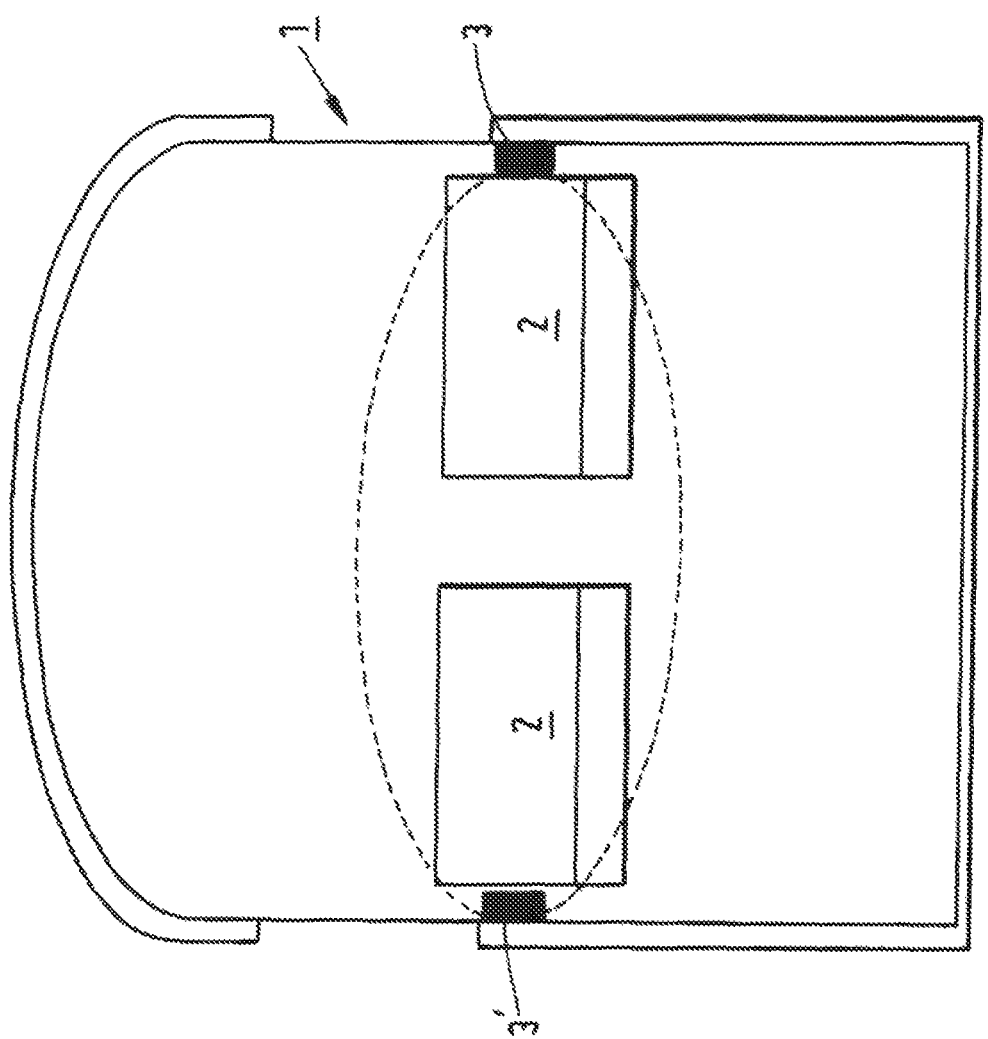
FIG. 2 is a cross-sectional view illustrating the arrangement in FIG. 1.
Figure 3:
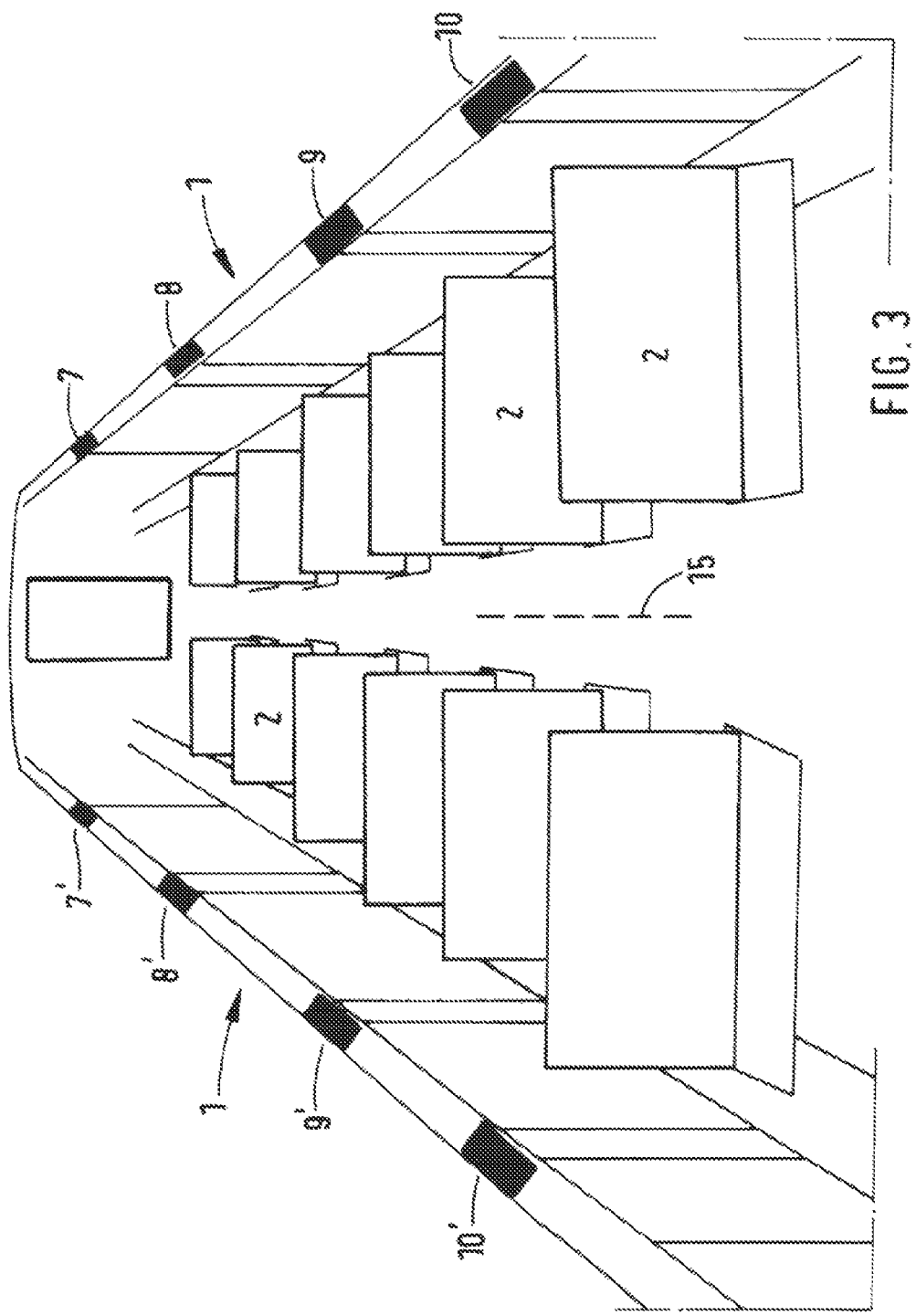
FIG. 3 is a perspective view of a variant of the embodiment of the arrangement of reading devices of the system for detecting customer media according to FIG. 1.

The subject of FIG. 3 is the arrangement according to FIG. 1, where each two reading devices 7, 7', 8, 8', 9, 9', 10, 10' are provided on opposite lateral walls of the passenger compartment, which cover the room up to the opposite wall, where the reading devices 7, 7', 8, 8', 9, 9', 10, 10' are arranged higher than in the example shown in FIGS. 1 and 2. The longitudinal axis of the passenger compartment is provided with the reference numeral 15.

Figure 4:
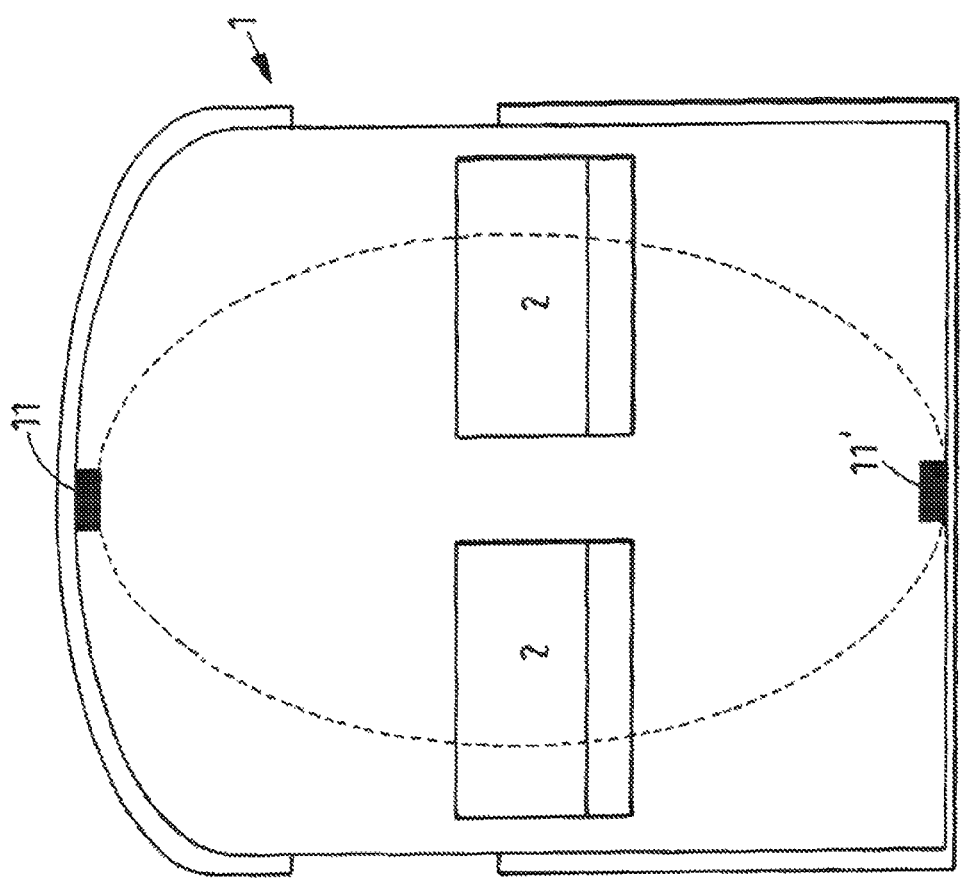
FIG. 4 is a sectional view of a passenger compartment showing another embodiment of the arrangement of reading devices of the system for detection of customer media.

In the example shown in FIG. 4, each two reading devices 11, 11' are arranged opposite one another in the floor area and roof area of the passenger compartment 1, where the reading devices 11, 11' cover the space up to the opposite roof area and or floor area. This embodiment features the advantage that this is optimally utilised because of the sufficient available space.

Figure 5:
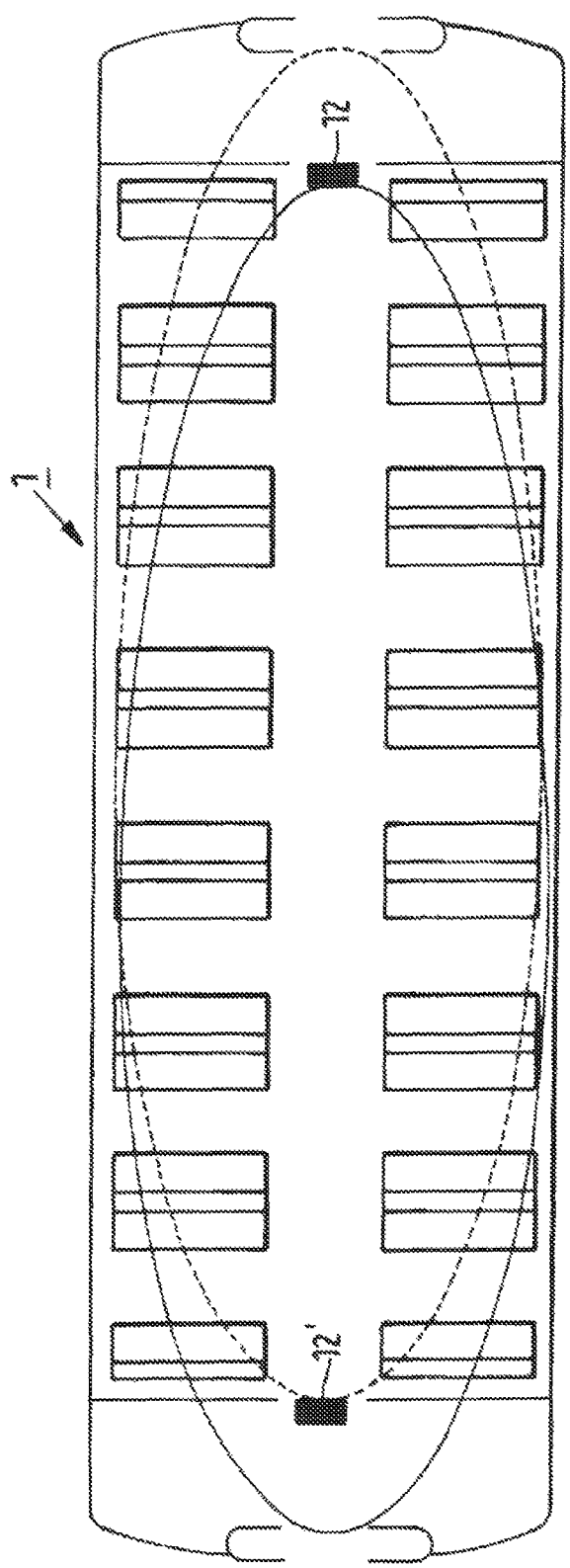
FIG. 5 is a schematic plan view of another embodiment of the arrangement of reading devices of the system for detection of customer media.

According to FIG. 5, two reading devices 12, 12' on the opposite end walls of a passenger compartment (front and rear walls) can be arranged for covering a passenger compartment 1, where the detection range of the reading devices extends to the reading device opposite of this reading device, by which the reading devices cover a common volume, which corresponds to the passenger compartment 1.

Figure 6:
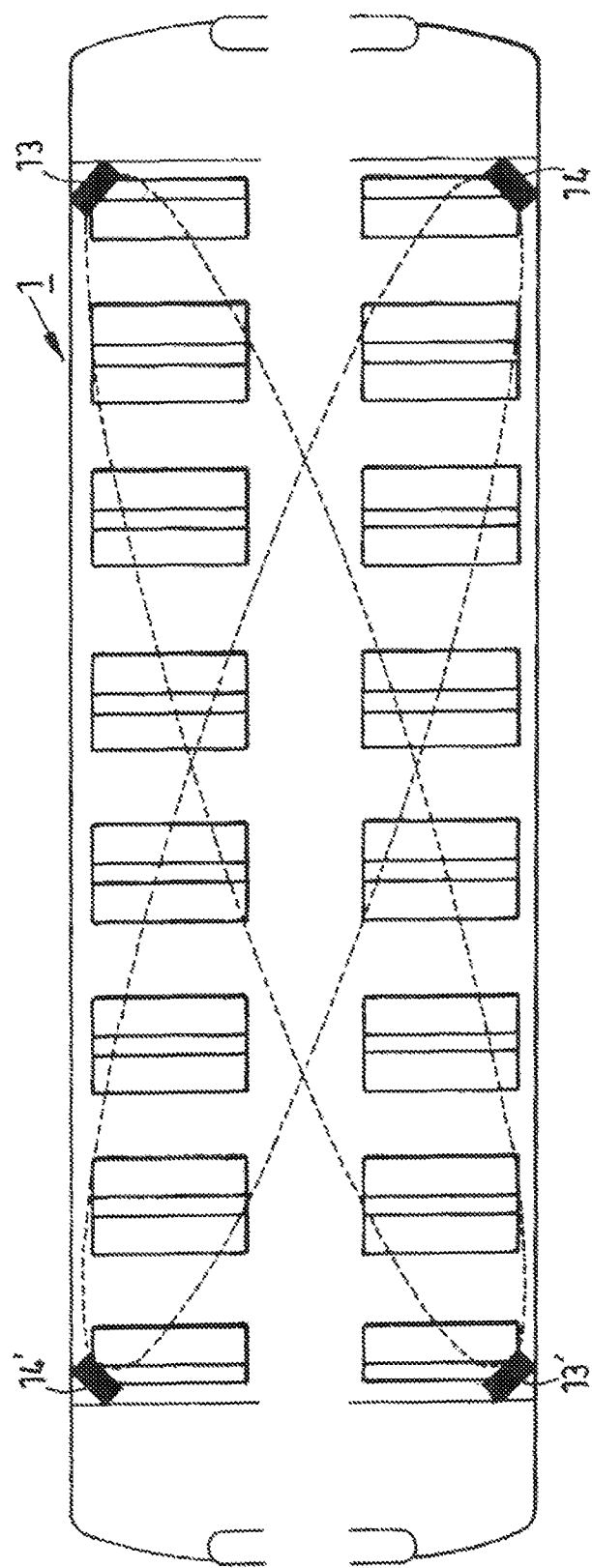
FIG. 6 is a schematic plan view of another embodiment of the arrangement of reading devices of the system for detection of customer media.

A further development of the arrangement according to FIG. 5 is shown in FIG. 6. Here, two reading devices 13, 13', 14, 14' are each arranged at opposite corners of the passenger compartment 1, where the detection range of the reading devices extends to the reading devices of the respective diagonally opposite reading device.

Figure 7:
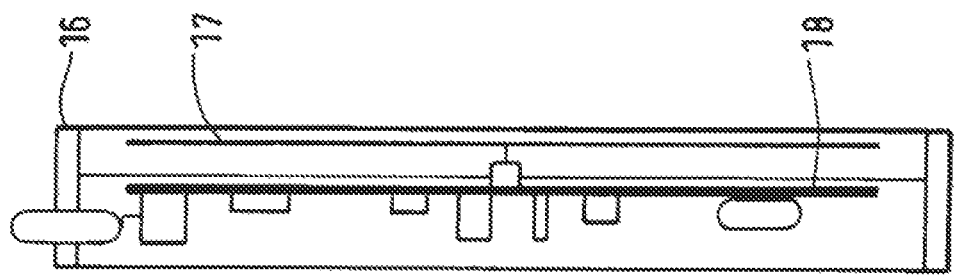
FIG. 7 is a schematic sectional view illustrating the structure of a reading device according to the invention.
Figure 8:
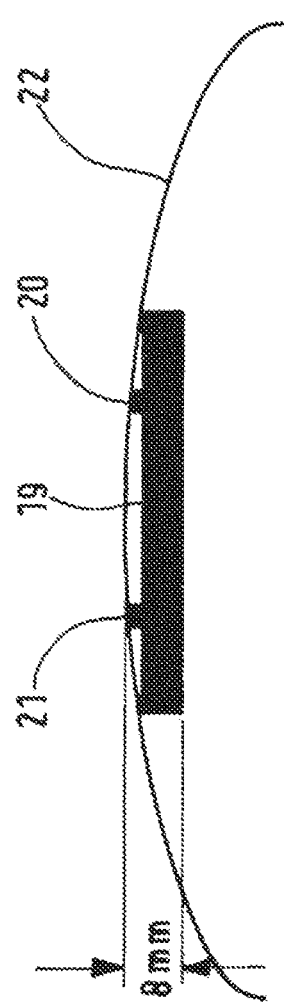
FIG. 8 is a schematic cross-sectional view of the arrangement of a reading device according to FIG. 7 on the roof of a passenger compartment.

Referring to FIG. 7, the reading devices feature a flat housing 16; the side facing the passenger compartment 1 in the assembled state contains the antenna 17, which is preferably designed on a PCB substrate 18, where the required electronics is arranged on the back side.

This configuration of the antennas also allows a slightly curved design as well as the provision of a flat plastic cover for the reading devices, so that an inconspicuous and appropriate placement of the reading devices in the roof are or the wall area of the passenger compartment is possible. In the example shown in FIG. 8, a reading device 19 is arranged in the roof area 22 of a passenger compartment by means of magnets 20, 21. The thickness of such a reading device is preferably 8 mm.

The system according to the invention can also be implemented to detect customer media in cinemas, museums and other enclosed spaces.

There has thus been shown and described a novel system for the detection of customer media comprising an RF transceiver in a public transport conveyance which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system for detecting customer media, each customer medium comprising an RF transceiver, in a public transport conveyance, wherein the system for each passenger compartment or car includes a number of reading devices that are interconnected and connected to computer serving as an on-board unit for the purpose of data communication; wherein detection in the entire interior area of the passenger compartment or car is covered by a number of reading devices; wherein the reading devices are arranged in such a manner that each two of said reading devices are arranged on opposite lateral walls of the passenger compartment or car, and where the detection range of each such reading device covers an interior area thereof that extends up to the opposite wall, or that each two of said reading devices are arranged in the roof area or floor area symmetrically around a longitudinal axis of the passenger compartment or car where the detection range of each such reading device covers an interior area thereof that extends between lateral opposite walls of the passenger compartment or car; and wherein the detection range of the respective two reading devises is substantially identical and substantially covers the entire width of the passenger compartment or car to provide redundant readings of the customer media, whereby detection in the floor area or the roof area is covered along a pre-specified axial length thereof.

2. System for detecting customer media according to claim 1, wherein, in the event that the reading devices are arranged in such a manner that each two of said reading devices are provided on opposite lateral walls of the passenger compartment or car, where the detection range of each such reading device covers the area up to the opposite wall, the detection range of a reading device mounted on the side wall of the passenger compartment or car extends to the reading devices located diagonally opposite to this reading device, thus having four reading devices covering a common volume.

3. System for detecting customer media according to claim 1, wherein, in the event that two reading devices are arranged symmetrically in the roof or in the floor area around the central longitudinal axis of the passenger compartment or car, where the detection range of the reading devices is substantially identical and substantially covers the entire width of the passenger compartment or car in the floor area or roof area thereof, the detection range of such arranged reading devices, viewed axially, fully or partially covers the detection range of the adjacent reading devices considered axially, where respectively up to six reading devices cover a common volume up to a predetermined height.

4. System for detecting customer media according to claim 1, wherein the number of the reading devices is dimensioned in such a manner that detection in the passenger compartment or the car is redundantly and completely covered without significant overreach beyond the passenger compartment or the car.

5. System for detecting customer media according to claim 1, wherein the reading devices respectively feature only one antenna for transmitting and receiving signals, which is designed as radiant and receiving antenna.

6. System for detecting customer media according to claim 5, wherein the antenna is implemented as patch antenna.

7. System for detecting customer media according to claim 6, wherein the reading devices feature a flat housing, where the side facing the passenger compartment or car in the assembled state contains the antenna and the required electronics is arranged on the back side.

8. System for detecting customer media according to claim 5, wherein the reading devices respectively feature a wake-up-modulator, via which a wake-up signal can be transmitted for the customer media by means of the antenna.

* * * * *